United States Patent [19]

Young

[11] 4,033,746

[45] July 5, 1977

[54] FOREST FERTILIZATION

[75] Inventor: Donald C. Young, Fullerton, Calif.

[73] Assignee: Union Oil Company of California, Brea, Calif.

[22] Filed: Dec. 22, 1975

[21] Appl. No.: 643,340

[52] U.S. Cl. .................................. 71/30; 71/28; 71/64 C; 71/1; 47/DIG. 13
[51] Int. Cl.² .................. C05C 9/00; C05C 1/00
[58] Field of Search .................. 71/1, 27–30, 71/64 C; 47/DIG. 13

[56] References Cited

UNITED STATES PATENTS

| | | | |
|---|---|---|---|
| 2,869,996 | 1/1959 | Vierling | 71/29 |
| 2,978,309 | 4/1961 | Buc | 71/1 |
| 3,046,105 | 7/1962 | Young | 71/51 |
| 3,539,325 | 11/1970 | Young et al. | 71/1 |
| 3,558,300 | 1/1971 | Wagner | 71/1 |
| 3,640,698 | 2/1972 | Backlund | 71/1 X |
| 3,663,197 | 5/1972 | Backlund | 71/1 X |

FOREIGN PATENTS OR APPLICATIONS 615,958  3/1961  Canada .................. 71/30

OTHER PUBLICATIONS

Feeding Plants with Foliage Sprays, Sprays, Beattie Horticulture, vol. XXXI, May, 1953, pp. 1209–1217.

Primary Examiner—Frank A. Spear, Jr.
Assistant Examiner—Ferris H. Lander
Attorney, Agent, or Firm—Richard C. Hartman; Dean Sandford; Michael H. Laird

[57] ABSTRACT

Conifer forests are fertilized with aqueous solutions of nitrogen compounds containing in excess of 15 weight percent equivalent nitrogen by foliar application at solution temperatures above 70° F. and above the prevailing ambient temperature. The solutions have compositions and concentrations such that they are stable at the elevated solution temperature but become over saturated at ambient temperature, thereby precipitating a substantial part, i.e., at least 10 percent of the nitrogen compounds on the conifer foliage.

5 Claims, No Drawings

FOREST FERTILIZATION

BACKGROUND OF THE INVENTION

Forest fertilization with both major and minor nutrients is an established, economically proven enterprise. The more our natural forest stands are depleted and the more demands for timber that are placed on the lumber industry, the more favorable the economics become for fertilizing timber forests. Prior practice involved application of nutrients exclusively in dry form, preferably as large prills of sufficient size to insure that the particles applied by aerial craft break through the forest canopy and reach the ground.

That practice offered several advantages. The use of solid nutrients as opposed to solutions reduces the weight required for a given nutrient dosage. This becomes particularly important in aerial application which, as the practical matter, is the only realistic way of covering extremely large, unaccessible forest lands. Secondly, it avoids adherence of concentrated solutions to the plant foliage which was previously considered a certain way of killing rather than benefitting forest trees.

As disclosed in my copending application Ser. No. 654,977, filed Feb. 4, 1976 now U.S. Pat. 4,033,747, incorporated herein by reference, very concentrated solutions of phytotoxic nitrogen compounds can be applied to conifer foliage. Considerable fertilizer benefit is obtained at acceptable mortality levels so long as certain limitations are observed. In particular, total dosage levels defined as the quantity of nitrogen applied per acre and/or foliage surface area (as opposed to nitrogen concentration in solution) must be maintained below a maximum tolerable level. In fact, as disclosed in my copending application Ser. No. 560,638, filed Mar. 21, 1975 and now abandoned, a certain mortality level can actually be beneficial to the overall forest population. Undesired species such as volunteer broadleaf varieties as well as weaker members of the preferred conifer population can be eliminated by the same procedure that fertilizes and accelerates the growth of the stronger preferred conifers.

As further described in my application Ser. No. 654,997, the practice of applying fertilizers in solid form suffers from several significant disadvantages. Firstly, the least expensive and most widely available nitrogen sources, e.g., urea and ammonium nitrate, can decompose rapidly after topical application with the consequence that a substantial amount of the nitrogen escapes as volatile ammonia unless the nitrogen source is promptly washed into the soil and converted to fixed nitrate. This problem is less severe if the solid nitrogen source can be turned into the soil shortly after topical application. A significant amount of the ammonia thus released becomes fixed to and retained by clay in the soil.

However, such practice is highly impractical if not impossible when dealing with remote forested areas. The decomposition and loss of urea, for instance, is accelerated by urease enzyme found in abundance in many soils. In fact, under the worst conditions, nitrogen losses from topical urea application can approach 80 percent.

Secondly, these nutrients must be applied as or converted to water soluble forms and must be dissolved before they become available plant nutrients. Thus topically applied nutrients can be leached or washed from the soil by excessive rain. This results can even disrupt the ecology of the area by contaminating the watershed and raising the salt content of surface water to objectionable levels. In fact, the United States Government has banned forest fertilization on a commercial scale on at least some of the forest lands under its control at least in part to prevent ground water contamination.

General fertilizer application accelerates the growth of all plants in the area. It preferentially accelerates the growth of plants to which the fertilizers are most readily available. In most instances these plants comprise the underbrush and, in many instances, volunteer broadleaf varieties, which should be eliminated or at least not benefitted by a competent fertilization method. However as shown in my copending application Ser. No. 560,638, topical fertilizer application actually accelerates the growth and proliferation of ground cover and other undesired tree species. This result serves only to increase competition for available plant nutrients, water, sunlight and other environmental qualities essential to rapid development of the preferred tree species.

As pointed out in both of my above referenced applications, aqueous solutions of the most economical and widely available nitrogen sources, ammonium nitrate and urea, are indeed phytotoxic. However, in the case of conifer trees, the detrimental effect of this phytotoxicity can be far outweighed by the beneficial fertilization effect of foliar application provided total dosage is maintained at a level below a tolerable maximum. I have now discovered that this maximum tolerable dosage level can be increased and/or the observed phytotoxic effect of foliar application evidenced by foliage desiccation and loss can be reduced by aerial application of solutions having nitrogen compound concentrations higher than the concentration that can exist at the conditions prevailing on the plant foliage itself.

It is therefore one object of this invention to provide an improved forest fertilization method. Another object is the provision of an improved conifer forest fertilization method which exhibits minimal detrimental effects or even beneficial effects on the general ecology of the urea. Another object is to reduce the application cost involved in foliar fertilization of conifer forests. Another object is the provision of an effective economical method for fertilizing conifer forests that can be practiced throughout the year, the practicality of which is not limited to seasonal periods of short duration such as the rainy season. Various other objects and aspects of this invention will be apparent from the accompanying disclosure and appended claims.

In accordance with one embodiment of my invention, conifer forests are fertilized by direct application to the foliage of aqueous solutions of nitrogen compounds containing at least about 15 weight percent as elemental nitrogen of a dissolved water-soluble nitrogen source at a dosage level of at least about 100 pounds of elemental nitrogen per acre and at least about 0.8 pounds of nitrogen per 1000 square meters of specific foliage area. The solution temperature, as sprayed, is at least about 70° F. and is at least equivalent to the saturation temperature of the solution. The solution temperature as sprayed is also above the prevailing ambient temperature which, in turn, should be below 70° F. and at least about 10° F. below temperature solution saturation.

I have found that the phytotoxicity of these solutions is a function of nitrogen source concentration in solution, dosage level defined on the basis of pounds per acre or pounds per specific foliage surface area, and, of course, the adequacy of spray distribution. Obviously uneven distribution will result in the application of higher dosages to some of the conifer foliage. Assuming the combination of effective solution concentration and dosage level on the average approaches the tolerable maximum, uneven distribution will result in undesired damage levels on some of the foliage. Therefore, care should be taken to assure at least reasonably even distribution to all foliage in the area.

I have also discovered, however, that the controlling parameter with respect to phytotoxicity is not total application rate per se or spray concentration as applied. On the contrary, it is a function of the dosage level of dissolved nitrogen compounds existing on the foliage at any one time. In other words, the degree of phytotoxicity exhibited by any given combination of dosage level and solution concentration is not increased by the presence of undissolved nitrogen compounds on the foliage surface. Therefore, higher dosage levels and/or higher solution concentrations as applied can be employed without exceeding the maximum tolerable or desirable phytotoxic effect. This is accomplished by spraying a solution at a concentration substantially above the concentration that can exist on the conifer foliage.

The solution as applied can contain any soluble nitrogen compound. It can contain other soluble nutrients or even compounds that do not act as plant nutrients but may serve as adjuvants or surface active agents. However, within the concept of this invention the solution should contain at least 15, generally at least 20, and preferably at least 25 weight percent elemental nitrogen in the form of urea, ammonia, nitrates of ammonium, calcium and potassium; ammonium phosphates and sulfates, or combinations thereof. These methods have particular utility when used with urea or ammonium nitrate. These compounds are generally more phytotoxic than are alternative nitrogen compounds. Therefore the preferred compositions contain the amounts of elemental nitrogen above specified as urea, ammonium nitrate and combinations of these two. However, these preferred solutions can also contain minor amounts of the other nitrogen sources or dissimilar plant nutrients or compounds.

The benefit achieved by these methods is a function of the differential between the solution concentration as sprayed and the concentration that can be maintained in solution on the foliage. Thus greater advantage is realized at higher concentration differentials. Nevertheless some advantage can be obtained even at nominal differentials between these two concentrations. As a practical matter, however, the solution concentration as sprayed should be at least about 10 percent and preferably at least about 20 percent greater than the concentration that can be maintained on the plant foliage based on elemental nitrogen.

The concentration differential is a function of several variables including relative humidity, ambient temperature, and the temperature of the solution as sprayed. While relative humidity can not be controlled, the operator can select conditions of either high or low relative humidity under which to practice these methods. The influence of this variable is due primarily to the degree and rapidity with which water is evaporated from the fertilizer solution during spraying and immediately after contact with the foliage. Low relative humidity increases the rate at which the water evaporates from the solution and, conversely, the rate at which solution concentration is increased. This change, to some extent, governs the effective dosage level of phytotoxic nitrogen compounds existing in solution on the foliage at any one time. That dosage level is reduced, and consequently the phytotoxic effect of the methods is commensurately reduced, at lower relative humidity. Accordingly, while it is not essential, it is presently preferred that the solutions be applied under conditions of relative humidity below 50 percent, preferably below 30 percent.

Relative humidity and ambient temperature can be selected; they can not be controlled. However, the differential between ambient temperature and the temperature of the solution as sprayed can be controlled. Thus this variable, the effective temperature differential, allows the operator to control the effective dosage level regardless of relative humidity and ambient temperature and is therefore the preferred control parameter.

These methods can be practiced under any conditions of ambient temperature and relative humidity. However, for practical purposes the solutions should be applied at ambient temperatures below about 70° F., preferably below about 65° F. Conversely, the solution temperature as sprayed, should exceed ambient temperature, generally by at least about 10° F., preferably at least about 20° F. As a practical matter solution temperatures should also exceed the saturation temperature. This condition is preferred in order to avoid plugging of conventional spraying apparatus. However, solutions containing entrained solids, a portion or all of which can comprise nitrogen compounds or other plant nutrients, can be handled with suitable equipment. As a consequence of these factors, solution temperatures will generally exceed 70° F. and preferably will be at least 80° F. or higher.

These conditions will generally be sufficient to assure that the dosage level of the solution as sprayed will be at least about 10 percent, preferably at least about 20 percent higher in nitrogen than is the effective dosage level existing on the plant foliage at any one time. In other words, the amount of nitrogen dispersed in the aerial spray determined as dissolved elemental nitrogen, will exceed the effective dosage level existing on the foliage as dissolved nitrogen by at least 10 and preferably by at least 20 percent. Due primarily to economic considerations involved in the cost of aerial spraying and the desirability of reducing the weight of solution required to obtain a given actual dosage (as opposed to effective dosage) from the standpoint of phytotoxicity, the preferred solutions are eutectic combinations of urea and ammonium nitrate which are saturated at temperatures at least 10° F. above ambient.

Actual dosage level, i.e., the total weight of nutrient corresponds to at least about 100 pounds of elemental nitrogen per acre which generally corresponds to at least about 0.8 pounds of nitrogen per 1000 square meters of specific foliage surface area. The term "specific foliage surface" is defined as that surface of the foliage to which the spray is applied and constitutes approximately one-half of the total foliage surface including both upper and under surfaces of the conifer needles. Actual dosage levels, including both dissolved and undissolved nitrogen, will generally fall within the range of 100 to about 600 pounds per acre and between about 0.8 to about 12 pounds of elemental nitrogen per 1000 square meters of specific foliage surface, and are generally adequate to accomplish the desired degree of fertilization in a single pass. The necessity of making multiple passes with expensive aerial application equipment and operators is eliminated. Application rate can be maintained at a level below that at which any substantial drainage occurs due to the high actual nitrogen dosages obtainable and the ability of these methods to attenuate phytotoxicity. This aspect offers the advantages mentioned above with respect to undesired ground cover fertilizer and ground water contamination.

While the degree of advantage realized through these methods is greater at the higher actual dosage levels within these ranges, some advantage is obtained even at the lower application rates. This is due to the fact that a minor amount of foliage, e.g., about 10 percent, may be lost in some conifer populations even at the lower dosage level of 100 pounds of elemental nitrogen per acre. This could be caused by several factors such as the sensitivity of younger trees to the particular nitrogen compounds applied, uneven distribution of spray due to the difficulty of precisely controlling aerial spray apparatus and air turbulence, and the like.

A substantial portion of the nitrogen compounds actually applied will exist on the foliage in undissolved form for some period of time. However, these nitrogen compounds, particularly ammonium nitrate and urea, are extremely hygroscopic and absorb water rapidly from the atmosphere. The dissolved compounds are rapidly assimilated by the plant foliage. Thus even a heavy rainfall does not wash away and significant amount of the fertilizer within a short period after application. Accordingly, this method is not seasonally limited. On the contrary, it can be practiced during either rainy or dry periods as desired.

Numerous other plant nutrients can also be included in the solution. For instance, potassium can be incorporated as the nitrate, chloride, phosphate, etc. Phosphorus can be added as ammonium or potassium phosphates or the like. Sulfur can be added as ammonium or potassium sulfates, sulfites, etc. Other micronutrients including iron, manganese, copper, zinc, etc. can be added in conventional forms such as zinc sulfate, ferrous sulfate, copper nitrate, and the like.

The conifer trees include the members of the family Pineceae commonly known as the Pine family. This family includes several genera each of which encompasses numerous species. The generic classes which constitute the principal commercial timber and wood byproducts crops are the Abies including all of the true firs such as Pony fir, Grand fir, Red fir, etc.; Picea including numerous species of spruce; Pinus including many species of pine such as loblolly, Ponderosa, lodgepole, white pine, etc.; Pseudotsuga or false hemlock, the Douglas fir being a member of this genus rather than a true fir; and the genus Tsuga including numerous species of hemlock. The remaining two pine family genera, while generally being of lesser commercial importance, are still suitable subjects for these fertilization methods. These include the genus Cedrus encompassing all species of cedar and the genus Larix encompassing the tamaracks.

There is of course an optimum combination of nitrogen source, solution concentration as sprayed, and actual and effective dosage level depending upon the objectives desired. These variables are generally governed by the total amount of fertilizer desired and the maximum degree of foliage burn tolerable. It is sometimes desirable to obtain a substantial degree of foliage desiccation and even tree mortality as discussed in more detail in application Ser. No. 560,638. As described in that application, some species of conifer are naturally stronger than others. Similarly, some members of the same species in any given population are stronger than other members. It is sometimes desirable to selectively thin out the weaker species or weaker members of the same species. Secondly, the several nitrogen compounds exhibit different levels of phytotoxicity at the same concentrations and effective dosage rates. For instance, the foliar burn on Douglas firs treated with 160 pounds per acre of a urea solution containing 20 weight percent dissolved nitrogen was only about one-half that observed with similar applications of ammonium nitrate. Thus the burning tendency of ammonium nitrate on Douglas fir was approximately twice as great as that of urea.

These differences can be readily evaluated for any particular application by a simple procedure in which solutions of several different compounds are applied at various effective concentrations to different test plots at different total dosage levels. For instance separate solutions of urea, ammonium nitrate, ammonium sulfate, etc., and combinations of these can be formulated to produce different effective nitrogen concetrations on the foliage, e.g., 15, 20, and 600 pounds of nitrogen per acre varying in 40-pound per acre increments. A study of this nature would allow correlation for the given tree population and growing conditions of the several variables which control foliar desiccation. The investigator can then select the particular combination of nitrogen compound, effective solution concentration and dosage level most appropriate for his purposes. The purpose of the study of course would be to determine which combination of variables obtain the desired objective.

Further in this respect I have also discovered as disclosed in copending application Ser. No. 560,638 that all species of conifer do not exhibit the same phytotoxic sensitivity for all nitrogen compounds as might be expected. For instance, Douglas firs are more susceptible to foliage burn with urea solutions than are hemlock or Grand fir. In contrast, hemlocks are significantly more sensitive to ammonium nitrate or combinations of ammonium nitrate and urea than are Douglas firs. Grand firs and Douglas firs exhibit approximately the same sensitivity to ammonium nitrate solutions. Thus depending upon the tree population and the desired objectives, solution compositions can be changed to obtain either more or less foliage burn by selecting different nitrogen source compounds or combinations. Four instance a low level of foliage burn would result from the treatment of a dominant Douglas fir stand with ammonium nitrate solutions or combinations of ammonium nitrate and urea. Higher effective dossage levels of urea solutions could be applied to dominant hemlock stands. The most beneficial compounds, combinations of compounds, effective and actual dosage levels and concentrations can be readily determined by the parallel screening test procedures described above.

Testing procedures of this type are well known to the art. They can involve field application to test plots of trees of the desired age or greenhouse tests on tree seedlings. Due to the severity of these tests, the use of seedlings between about 3 and about 12 months old in greenhouse tests is preferred. Different age seedlings can be employed although trees in this age group are suitable.

One suitable approach for greenhouse or small plot testing is the so-called log sprayer method well known to the art. The tree seedlings are aligned in a plurality of rows, e.g., up to 100 rows or more. The sprayer usually comprises a spray pipe parallel with the rows and extending over the samples to be sprayed. It travels across all of the sample trees sequentially from one row to the next. The sprayer is supplied from a reservoir that initially contains a predetermined amount of a solution of known composition. As the solution is consumed it is simultaneously diluted with water at a predetermined rate so that the concentration of the applied solution varies sequentially from one row to the next. Thus, the full range of solution concentrations and dosage levels can be covered from one extreme to the other.

The initial solution concentration can be fixed at a level which will kill all trees in the population while few if any of the trees will be killed by the most dilute solution at the end of the test. Observation of the total population after a period of time sufficient to exhibit the affects of spraying, e.g., about 2 to 3 weeks, will enable the investigator to closely approximate the conditions of solution concentration and dosage level most desirable for his purposes. The controlling variable in each instance is the effective dosage level determined by the amount of the nitrogen compound which actually remains dissolved in solution on the paint foliage.

Obviously numerous other testing procedures could be employed. For instance, solution concentration could be maintained at the same value throughout the test while varying spraying rate. This approach would allow treatment of all sample trees with a solution of the same composition at different dosage levels. Similarly, parallel tests can be run on a plurality of sample groups using solutions of different compounds, mixtures of compounds, different concentrations, various temperature gradients between solution and ambient temperatures, and the like, to evaluate these variables.

These methods can also be employed to accomplish both fertilization and selective thinning as described in my above-identified application. As a general rule, significant differentiation between broadleaf and Pineceae trees can be obtained at effective dosage levels of at least about 30 pounds per acre. Complete elimination of all broadleaf species can be accomplished at effective dosage levels of about 50 pounds nitrogen per acre or greater. At the minimum dosage levels, the foliage loss by the pine trees is nominal at most. Preferably the effective dosage level should not be so high as to cause more than 30 percent foliage loss of the preferred conifers. Conditions causing this degree of conifer foliage loss can be easily determined by the testing procedure described above. As a general rule, however, the conifers can be treated at relatively high effective nitrogen levels, i.e., up to 400 pounds of nitrogen per acre, without unacceptable foliage loss.

A similar technique can be used to determine the conditions that should be used to differentiate the stronger and less hardy members of the same species. For instance, a population of Douglas fir, loblolly pine or the like could be treated at effective dosage levels sufficient to burn about 30 to about 50 percent of the foliage of the total population on the average. Some trees, the less hardy members of the species, would be burned to a much greater extent than will the hardier members. Thus the stronger trees might suffer only 20 to 30 percent foliage loss while the weaker trees might lose 80 percent or all of their foliage at the same dosage. The dosage level required for this effect depends on the several variables discussed above such as the nitrogen source, effective solution concentration on the foliage, tree species, site class, climate, etc. As a general rule, however, effective dosage levels employed to distinguish between the weaker and the stronger members of the same species of Pineceae will range between about 150 and 600, preferably between about 200 and about 400, pounds of nitrogen per acre. These would correspond to total dosage levels of 200 to 800, preferably 250 to 550 pounds per acre including undissolved nitrogen.

The results of these tests will usually become apparent fairly rapidly, i.e., within several weeks, generally within about 2 weeks. The extent of foliar burning can be readily determined by visual inspection after two weeks or, if desired, over a period of time, e.g., at 2, 4 and 6 weeks, etc. These observations can be quantified as burn index by any method that allows the investigator to evaluate the extent of foliar damage on the different species of members. For instance, burn index can be graded on a scale of 1 to 10: the minimum value of 1 indicating that less than 10 percent of the total foliage is damaged, i.e., spotted, brown or missing. The maximum value of 10 is assigned if 91 to 100 percent of the total foliage is damaged. Intermediate values are assigned proportionately for intermediate damage levels. Thus a burn index of 7 would correspond to a damage level of 61 to 70 percent indicated by foliage browning or loss.

Fertilization effect can be graded by evaluating the degree of foliage greening. The presence or absence of foliage greening can be determined by comparing the original foliage color to a series of standard color plates. Comparison of these plates to the foliage after treatment will then indicate whether or not the treatment has produced a change in foliar color. Color change or index can be graded on a scale of 1 to 5 as follows: (1) no apparent change; (2) possible but questionable change; (3) probable change; (4) most probable change; and (5) certain change or increased greening. Other scales and indications can also be employed.

These results will generally enable the investigator to determine offhand, at least qualitatively, the presence or absence of desiccation and greening effects. More accurate correlations are possible with statistical procedures such as regression analysis. Such procedures are well known and enable evaluation of the relationships between the observed data and tree species, nitrogen compound type, dosage level, solution concentration and the like. They also afford an indication of the reliability of these results, i.e., the correlation coefficients which relate to the certainty with which the particular result can be predicted. Having these results, the investigator can then select the nitrogen compounds, solution concentrations and dosage levels that will best serve his purposes by selecting the values for each variable which will produce the desired degree of species differentiation and/or fertilization.

The solutions can be applied by hand spraying or mechanical spraying from land vehicles or can be aerially applied by helicopter or other aircraft. Solution application rates will be determined by the desired effective and total solution concentrations and the effective and total dosage levels. These application rates usually correspond to abut 15 to about 200 gallons per acre. A second consideration is the amount of solution required for sufficient foliage coverage and adequate distribution while avoiding substantial drainage to the forest floor. Such drainage should be avoided for several reasons. Little benefit is achieved by applying fertilizer to the forest floor and such application results in contamination of ground water and adjacent rivers and streams.

Due to the high total dosage rates obtainable per pass, adequate fertilization can be achieved by a single application every three to five years. Obviously applications can be made more or less frequently if desired. Applications are preferably made shortly before or during the active growing season, e.g., in the early or late spring so that the best advantage is achieved most readily from the fertilizer effect on the preferred species. Similarly, the effect of selective thinning, when desired, is more apparent during the active growing season, particularly in the case of broadleaf species, due to the higher foliage levels during that period.

I have also discovered a rather unexpected reaction of conifers to spraying at relatively high effective dosage levels in the early spring prior to bud burst. Even though effective solution concentrations and dosage levels may be sufficiently high to promote at least 30 percent loss of the old foliage, i.e., that existing prior to bud burst, the nitrogen compounds are nevertheless assimilated by the tree and are transmitted from the treated foliage into the limbs and branches. This conclusion is derived from the observed response of the new foliage after bud burst.

While the old foliage can be damaged and lost at high dosage levels, e.g., 400 pounds of nitrogen per acre and higher, substantially higher levels are required to induce any observable damage to the new, unopened buds. However, after bud burst the new foliage grows substantially faster and within 12 weeks may be as much as twice as long as the new foliage on untreated trees. This result was not anticipated since the new foliage was contained in closed buds at the time of fertilization. It was not contacted directly with fertilizer solution. Nevertheless the new foliage showed substantial benefits from the fertilizer treatment even though the dosage level was sufficiently high to cause a substantial loss of old foliage. The observed fertilization of the new foliage could only occur by transmission of the fertilizer components or derivatives thereof from the exposed old foliage, into the tree structure and thence to the new foliage after bud burst.

Therefore another embodiment of this invention constitutes the application of fertilizer solutions having the described compositions, concentrations and at these dosage levels prior to bud burst. The time of application would generally be at least 2 days and preferably about 1 to about 4 weeks prior to bud burst. This procedure allows fertilization at dosage levels and effective solution concentrations otherwise sufficient to damage and temporarily deter new foliage growth, without any actual damage to the new foliage.

The solution can contain other components including micronutrients, insecticides, fungicides, selective herbicides and surfactants. A minor amount of surfactant assures adequate wetting of exposed foliage. The micronutrients are well known in the art and include iron, cobalt, molybdenum, manganese, copper, boron, zinc and magnesium. They are preferably incorporated as water soluble salts at concentrations corresponding to 0.01 to about 5 weight percent of the metal. Suitable compounds include the sulfates, nitrates, phosphates, halides and the like, although the halides are less preferred in some cases due to their phytotoxicity.

Macronutrients such as potassium and sulfur can be added in conventional forms such as the soluble potassium salts or sulfur-containing salts and acids, e.g., potassium nitrate, potassium sulfate, sulfurous acid, and the like. Concentrations of these materials usually correspond to about 2 to about 20, preferably about 2.5 to about 10 weight percent determined as $K_2O$ and $SO_3$. Phosphate requirements can also be supplied as water-soluble phosphorus compounds such as ammonium or potassium orthophosphates, pyrophosphates, tripolyphosphates, and the like.

The solutions can also include iron nutrients in forms which can be assimilated by the plants. I have also discovered that many water soluble iron compounds reduce the foliage burning tendency of these solutions. Accordingly, the effective nitrogen dosage level can be increased substantially, e.g., by about 20 percent, when using iron-containing solutions to obtain the same degree of foliage burn and/or differentiation if desired. The exact degree of burning attenuation attributable to the iron compounds can be readily determined by the parallel screening procedures described herein.

The compounds and solutions described in the U.S. Patents 3,679,377 and 3,753,675 are illustrative of materials suitable for use in this embodiment. These solutions contain from 0.05 to 20 weight percent iron in the ferric oxidation state and are prepared by the addition of metallic iron or a ferrous halide, nitrate or $C_1$ to $C_5$ carboxylate to an ammonium nitrate solution having from 5 to about 70 weight percent ammonium nitrate and a pH from 1 to about 3 at autooxidation conditions comprising a time and temperature sufficient to cause evolution of nitrogenous gases from the solution and to impart to said solution a red coloration. The resulting solution contains a highly soluble complex of iron which is believed to be present as a $\mu$-dihydroxo diferrate anion in complex association with a total of eight additional ligands, at least two of which are sulfato, halo or nitroso and the balance being aquo or hydroxo.

The complexes can be recovered from the ammonium nitrate solution used in their preparation by extraction with acetone and concentration of the acetone extract until the following ammonium salts precipitate:

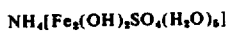

These salts can then be dissolved in the nitrogenous solution. Alternatively, urea or excess nitrate can be added to the ammonium nitrate-iron complex solution to obtain mixed solutions.

EXAMPLE 1

This example illustrates the manner in which the methods of this invention can be employed. An illustrative forested area is a heavily overstocked, replanted location in the State of Washington containing 4 to 8 year old conifers ranging from 3 to about 6 feet in height with a population density of about 30,000 confer trees per acre. The conifers comprise primarily Douglas fir with smaller percentages of hemlock and Grand fir. Broadleaf varieties include vine maple and alder ranging in height from seedlings to over 6 feet cover approximately 30 to about 40 percent of the ground surface. The soil is a poor gravelly loam, 18 to 36 inches in depth over compacted glacial till having an approximate 8 percent slope with North aspect. The site could be divided into a plurality of separate test plots each having an area of 2 milliacres. Each plot is separated from adjacent test plots by untreated guard plots to prevent overspraying.

Approximate foliage surface area and specific surface area can be determined by several procedures. Correlations are available for determining the weight of tree foliage from a knowledge of trunk diameter at breast height (dbh). For a stand of many trees the dbh value can be an average of the total population. These correlations are based on the expression:

$$\text{Log } w = F(\log dbh) + C$$

wherein $w$ is the dry foliage weight in grams, $dbh$ is as defined above and expressed in centimeters, $F$ is an emperically established coefficient having the value of 1.87366 roughly fitting all trees, and C is an emperical constant having the approximate value of 1.30658 as a rough fit for all trees. The dry foliage weight ($w$) is determined by drying the foliage to a constant weight at about 70° C. in an oven.

More precise estimates can be made for Douglas fir (DF) where the following values of F and C have been determined as shown in Table 1.

Table 1

| Age | Stocking Trees/acre | F | C | dbh |
|---|---|---|---|---|
| 28 years | 1500 | 2.34 | 1.9668 | inches |
| 28 | 535 | 3.39 | 0.3556 | inches |
| 37 | 585 | 2.47 | 1.6839 | inches |
| Overall correlation (DF) | | 2.097 | 1.1588 | centimeters |

With conifers, and typically with Douglas fir, the total surface area can be determined by the expression:

$$A_t = 0.01331 \, w$$

wherein $A_t$ is total foliage area in square meters per acre and $w$ is dry foliage weight in grams per acre. The surface exposed in most types of ground or aerial application is one-half $A_t$. As used herein, specific foliage area, $A_s$, is calculated as one half $A_t$ using for $w$ the grams of foliage per acre.

The above-described conifer stand had a foliage area per tree of about 0.945 square meters. This corresponds to a specific exposed foliage area ($A_s$) of about 14,190 square meters per acre.

The test plots can be treated with the solutions and at the conditions defined in the following Table:

Table 2

| Ex. No. | Compound[1] | $C_s$ wt.% | Tsoln, °F.[2] | $C_e$ wt.% | Tsat, °F. | $C_e/C_s$ |
|---|---|---|---|---|---|---|
| 1 | water | | 80 | — | — | — |
| 2 | urea | 58 | 100 | 47 | 90 | 0.79 |
| 3 | urea | 52 | 80 | 47 | 75 | 0.88 |
| 4 | urea | 48 | 60 | 47 | 60 | 0.93 |
| 5 | urea-NH$_4$NO$_3$ eutetic | 96 | 100 | 85 | 90 | 0.90 |
| 6 | " | 92 | 80 | 85 | 75 | 0.92 |
| 7 | " | 88 | 60 | 85 | 60 | 0.97 |
| 8 | NH$_4$NO$_3$ | 71 | 100 | 61 | 90 | 0.86 |
| 9 | " | 66 | 80 | 61 | 75 | 0.92 |
| 10 | " | 63 | 60 | 61 | 60 | 0.97 |

Table 2-continued

| Ex. No. | Compound[1] | $C_s$ wt.% | Tsoln, °F.[2] | $C_e$ wt.% | Tsat, °F. | $C_e/C_s$ |
|---|---|---|---|---|---|---|
| 11 | ⎡NH$_4$NO$_3$+1.5 wt.% Fe or | 71 | 100 | 61 | 90 | 0.86 |
| 12 | soluble iron sulfate | 5 | 80 | 61 | 75 | 0.92 |
| 13 | ⎣complex ⎦ | 63 | 60 | 61 | 60 | 0.97 |
| 14 | dry urea prills | — | — | — | — | — |

[1]All solutions contain 0.5 weight percent Emcol H2A surfactant.
[2]Ambient temperature is 50° F. and relative humidity is about 50 percent in all cases.

$C_s$ is solution concentration at the solution application temperature expressed as weight percent elemental nitrogen.

$C_e$ is the effective solution concentration at ambient temperature on the foliage surface expressed as weight percent elemental nitrogen. These values assume no significant water loss prior to contacting the leaves. This assumption is relatively accurate in view of the high relative humidity.

$T_{soln}$ is solution temperatures as applied while $T_{sat}$ is the saturation temperature of each respective solution. Separate test plots can be treated with these different solutions at different total dosage rates, e.g., 20, 40, 80 and 160 pounds of nitrogen per acre total. The water test (Example 1) and the dry urea prills (Example 14) can be used as comparisons. Effective dosage rate — the amount of solute remaining in solution at equilibrium on the foliage surface at ambient temperature on a per acre basis — is proportionate to the difference between $C_s$ and $C_e$. Thus the effective dosage rate is determined by multiplying total dosage rate by $C_e/C_s$.

All plots can be evaluated visually for foliar burn and foliage greening at 2, 6 and 10 week intervals after treatment by the methods described above. The treatments of Examples 1 and 14 will not cause any foliar burn. All the broadleafs will be significantly damaged at the lowest dosage levels and will be completely destroyed at effective dosage levels of 40 pounds nitrogen per acre and higher. All dosage levels will result in accelerated conifer growth and foliage greening. However, differentiation between the different conifer species will become apparent only at higher effective dosage levels. For instance, hemlock and Grand fir are more tolerant to solution urea than are Douglas fir trees. Conversely, Douglas and Grand fir are more resistant to burning by by ammonium nitrate than are hemlock trees. Thus at higher effective dosage levels ammonium nitrate solutions can be employed to selectively retard hemlock growth rate relative to Douglas fir and Grand fir. Urea solutions can be used to selectively retard Douglas fir growth rate relative to hemlock and Grand fir. However, substantially higher effective dosage rates, e.g., 200 pounds of nitrogen per acre or more, will be required to eliminate any significant portion of any conifer species of a stand having the foliage area defined above or produce lasting differentiation between conifer species.

I claim:

1. The method of fertilizing conifer forests with nitrogen containing compounds by direct aerial application to the conifer foliage of an aqueous solution of said compounds containing at least about 15 weight percent determined as elemental nitrogen of a dissolved water soluble nitrogen source selected from the group consisting of urea, ammonia, nitrates of ammonium, calcium and potassium; ammonium phosphates and sulfates; and combinations thereof, at a dosage level of at least about 100 pounds of elemental nitrogen per acre corresponding to at least about 0.8 pounds of elemental nitrogen per 1000 square meters of specific foliage area, at a temperature of at least about 70° F., above the saturation temperature of said solution, and above the prevailing ambient temperature, and said ambient temperature is at least about 10° F. below the saturation temperature of said solution.

2. The method of claim 1 wherein said ambient temperature is below about 70° F., said solution concentration corresponds to at least about 20 weight percent elemental nitrogen derived from urea, ammonium nitrate and combinations thereof, said solution temperature is at least about 20° F. above said ambient temperature, said ambient temperature is at least about 10° F. below said saturation temperature, and said solution is applied to said conifers at a dosage level corresponding to about 100 to about 600 pounds of elemental nitrogen per acre of said conifer forest.

3. The method of claim 2 wherein said solution contains about 0.1 to about 2.5 weight percent of a surfactant, and said solution is applied to said foliage at a volume insufficient to cause any substantial draining of said solution from said foliage.

4. The method of claim 1 wherein said solution temperature is at least about 80° F. and at least about 20° F. above said ambient temperature, and said solution contains at least about 25 weight percent elemental nitrogen derived from urea, ammonium nitrate and combinations thereof corresponding to at least about 20 percent more elemental nitrogen than is soluble in said solution at said ambient temperature.

5. The method of claim 1 wherein said conifers comprise members selected from the group consisting of Grand Fir, Douglas Fir, Western Hemlock and combinations thereof, and said solution comprises the eutectic combination of urea and ammonium nitrate and has a concentration of said eutectic corresponding to saturation at a temperature of at least about 10° F. above said ambient temperature.

* * * * *